Figure 1:
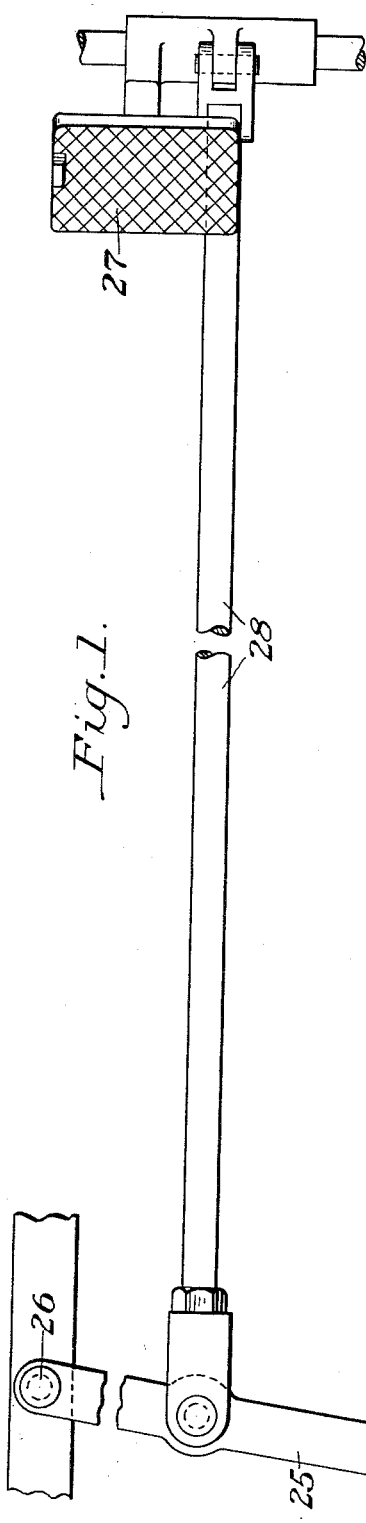

Jan. 24, 1928.

K. COTTRILL 1,657,345

GEAR SHIFTING MECHANISM

Filed June 19, 1924    4 Sheets-Sheet 1

INVENTOR

Jan. 24, 1928.
K. COTTRILL
1,657,345
GEAR SHIFTING MECHANISM
Filed June 19, 1924  4 Sheets-Sheet 3
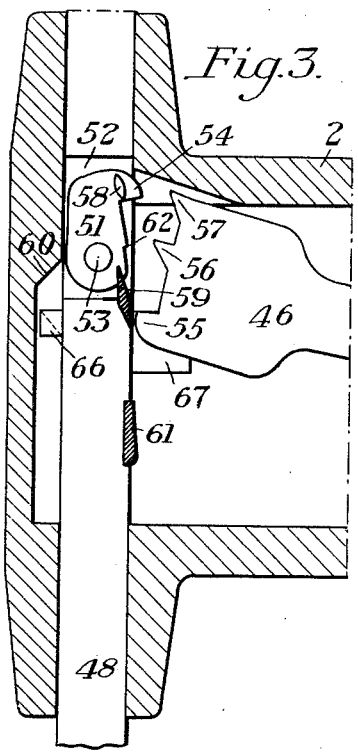
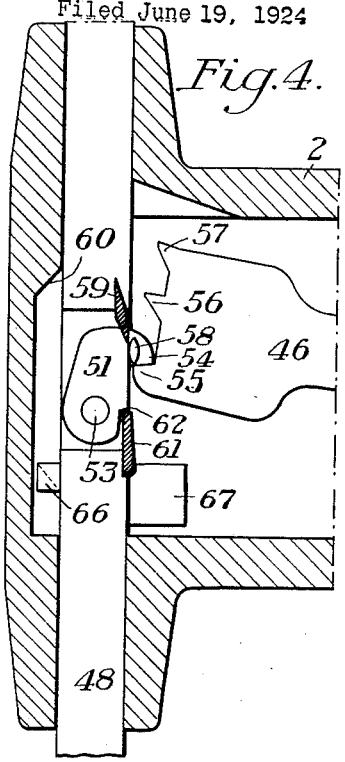
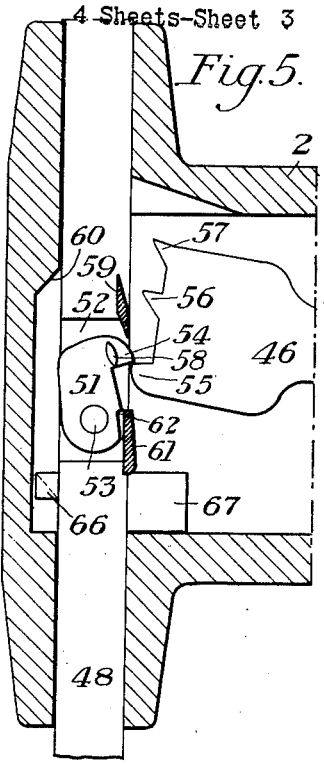
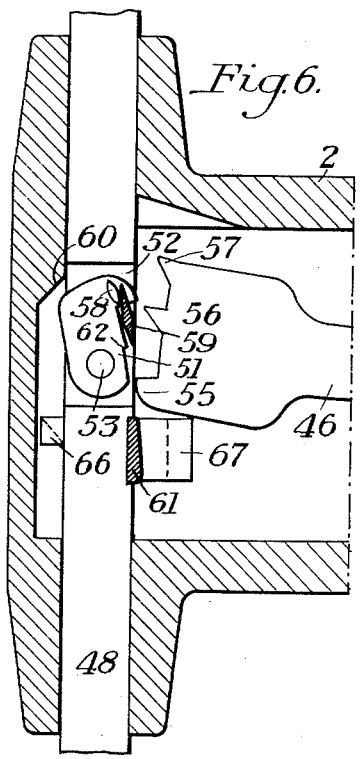
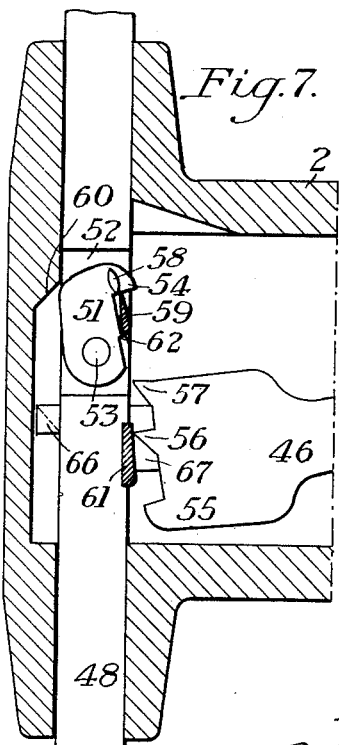
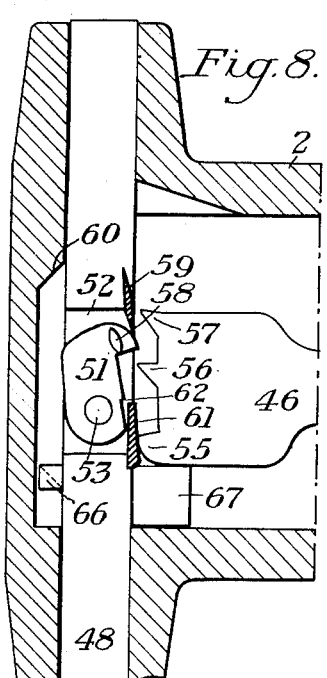

Jan. 24, 1928.  1,657,345

K. COTTRILL

GEAR SHIFTING MECHANISM

Filed June 19, 1924  4 Sheets-Sheet 4

INVENTOR
Kenyon Cottrill
By Byrnes, Stebbins & Parmelee
His Attys

Patented Jan. 24, 1928.

1,657,345

UNITED STATES PATENT OFFICE.

KENYON COTTRILL, OF PITTSBURGH, PENNSYLVANIA, ASSIGNOR TO J. ROGERS FLANNERY, OF PITTSBURGH, PENNSYLVANIA.

GEAR-SHIFTING MECHANISM.

Application filed June 19, 1924. Serial No. 720,990.

The present invention relates to gear shifting mechanism embodying means whereby the selection of the gears to be shifted is rendered substantially automatic.

In the preferred embodiment of my invention, which is illustrated in the accompanying drawings, in connection with the change-speed gearing of a motor vehicle, the shifting of the gears is effected by operation of the clutch pedal and the selector means functions automatically in such manner that successive operations of the clutch pedal are effective to shift the gears from reverse to low, from low to intermediate, from intermediate to high, and then alternately from high to intermediate and from intermediate to high until the selector means is manually set in neutral or for either low speed or reverse. I consider this the most practical form of progression for transmission mechanism having the usual three speeds forward and reverse, but the invention is not limited to this particular form of progression.

In the drawings:—

Figure 13:
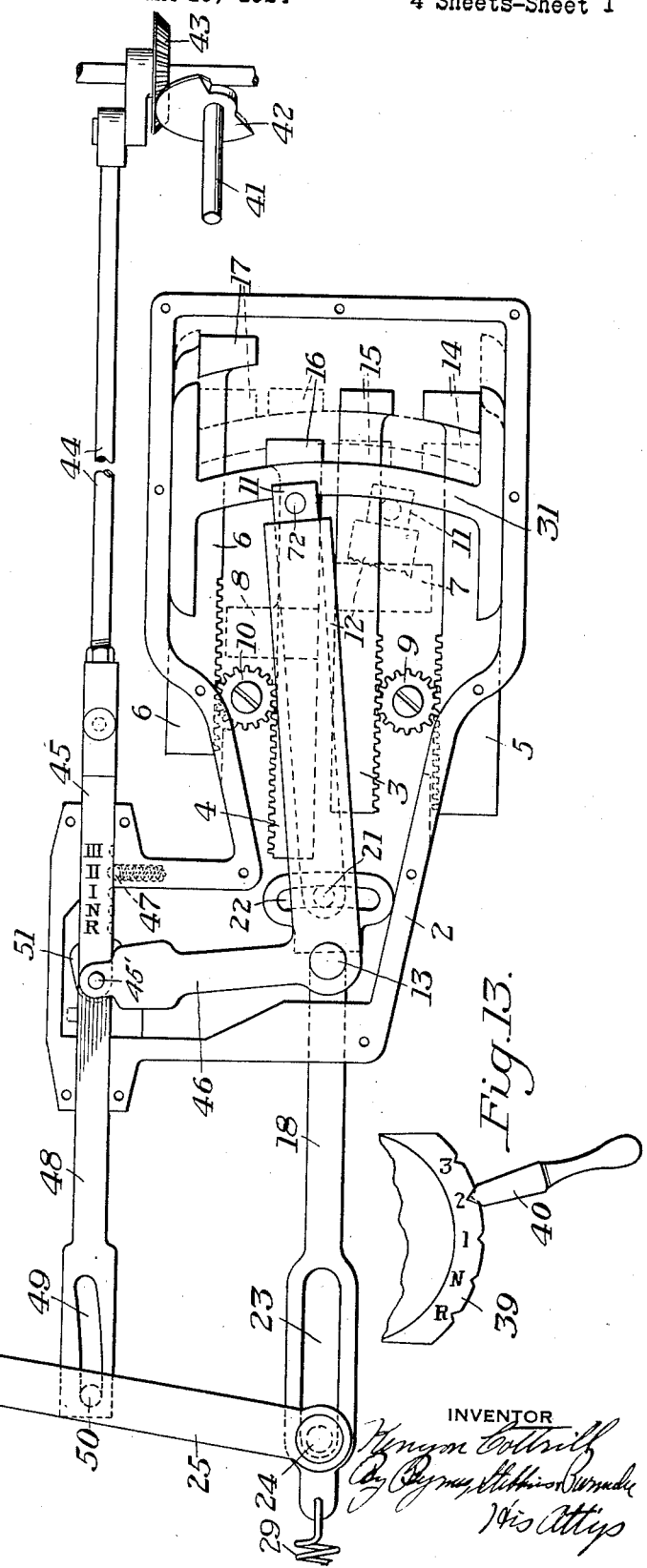
Figure 2:
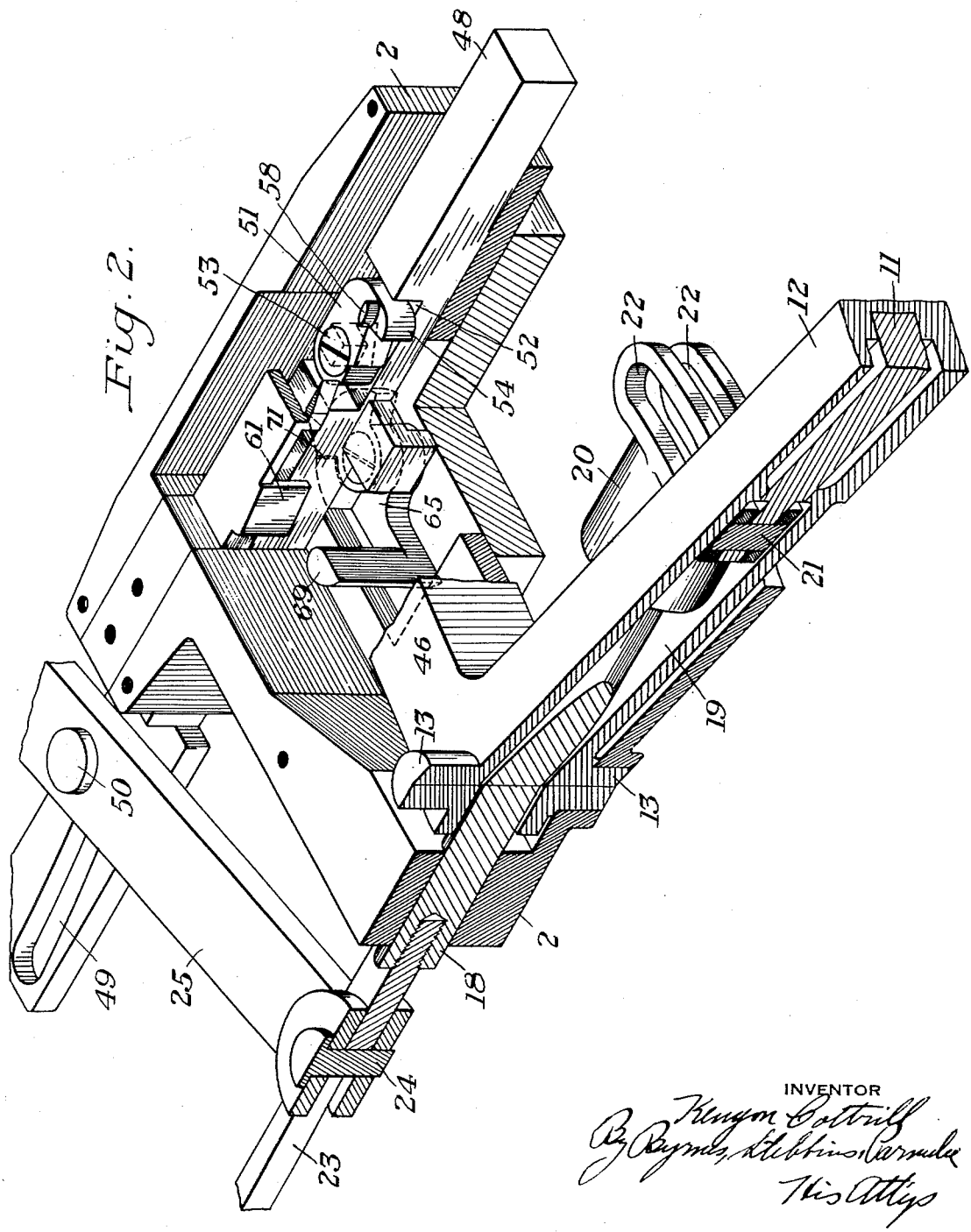
Figure 9:
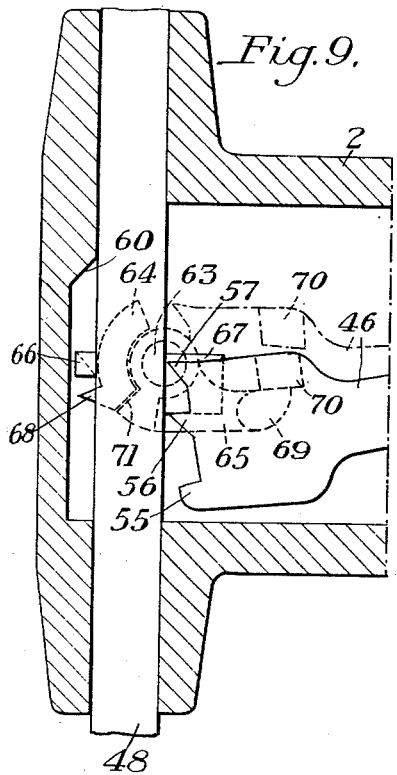
Figure 10:
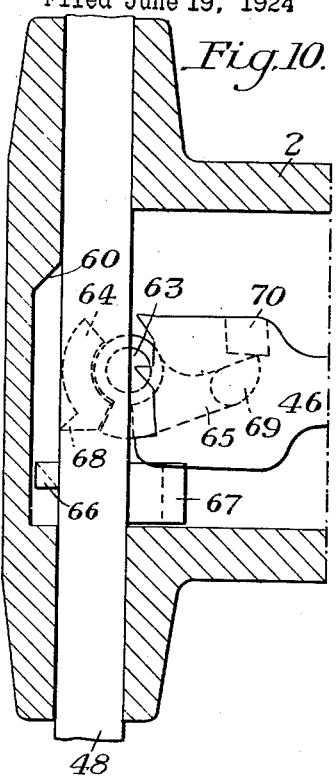
Figure 11:
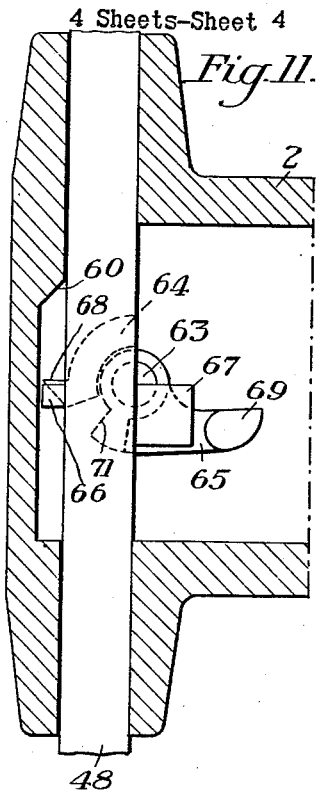
Figure 12:
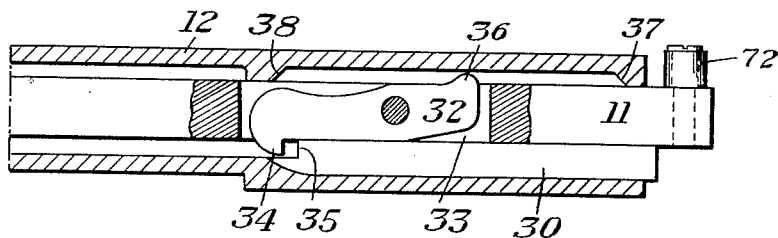

Figure 1 is a plan view of the gear shifting mechanism and of its operative connection to the clutch pedal, the cover of the casing in which the mechanism is housed being removed to expose the parts therein, Figure 2 is a perspective view partly broken away, on a larger scale, of the gear shifting mechanism, Figures 3 to 8 inclusive are detail views showing the various positions assumed by the dog for advancing the selector lever from reverse to low, from low to intermediate and from intermediate to high, Figures 9, 10 and 11 are views similar to Figures 3 to 8 showing the means for moving the selector lever from high to intermediate, Figure 12 is a detail sectional view through the selector lever and actuator bar and showing the neutralizing plunger and the dog for operating the same, and Figure 13 is a detail view showing the hand control lever for the selector lever and the quadrant with which it cooperates.

The illustrated embodiment of the invention comprises a casing 2 located above the housing which contains the transmission gearing. Mounted for longitudinal sliding movement in the casing are four gear shift rods 3, 4, 5 and 6. The rods 3 and 4 carry gear shifting forks 7 and 8 which extend below the bottom of the casing and operatively engage the transmission gearing. It has not been deemed necessary to show any portion of the transmission gearing, but it will be understood that by shifting the rods 3 and 4 in opposite directions different combinations of gearing will result for driving in reverse or any one of the three speeds forward. The rods 3 and 4 are operatively connected to the rods 5 and 6 by pinions 9 and 10, the teeth of which mesh with rack teeth on the adjacent faces of the rods. It will be apparent that outward movement of the rods 3 and 4 will effect inward movement of the rods 5 and 6 through the pinions 9 and 10, and vice versa.

Outward movement of the rods 3, 4, 5 and 6 is effected through an actuator bar 11 slidably mounted in a selector lever 12 having journal portions 13 adjacent its rear end whereby it is pivoted in the casing 2. The gear shifting rods have lugs 14, 15, 16 and 17 projecting upwardly therefrom, any one of which is adapted to be engaged by the outer end of the actuator bar when the latter is aligned therewith, whereby outward movement of the actuator bar will shift the corresponding gear shifting rod outwardly to effect the desired combination of the transmission gearing.

Sliding in a bearing in the rear end of the casing 2 is a push-rod 18. This rod extends into a slot 19 in the rear end portion of the selector lever and has a clevice 20 attached to its forward end. The clevice is bifurcated to receive the rear end portion of the actuator bar 11, said rear end portion having a pin 21 mounted therein, the end portions of said pin extending into arcuate slots 22 in the bifurcated portions of the clevice.

The rear end portion of the push-rod 18 has a longitudinal slot 23 therein which receives a pin 24 carried by one end of a rocker arm 25. The rocker arm is pivoted at its other end at 26 to the frame of the vehicle and is operatively connected to the clutch pedal 27 by a connecting rod 28. A coil spring 29 is connected to the rear end of the push-rod 18 whereby the latter is normally held retracted.

Sliding in the forward end portion of the selector lever beneath the actuator bar is a neutralizing plunger 30. This neutralizing plunger is adapted to cooperate with a neutralizing bar 31 slidably mounted in the casing 2 and extending transversely thereof behind the lugs 14, 15, 16 and 17. The actuator bar 11 has a dog 32 pivotally mounted in a vertical slot 33 therein. At its rear end the dog has a downwardly extending hook 34 adapted to engage a shoulder 35 at the rear end of the plunger 30. At its forward end the dog has a cam portion 36 adapted to engage an inclined shoulder 37 projecting downwardly from the top of the selector lever. Normally, the actuator bar, the neutralizing plunger and the dog are in the relative positions shown in Figure 12. When the operator actuates the clutch pedal the actuator bar is moved outwardly and the neutralizing plunger 30 is carried outwardly with it by reason of the engagement of the hook 34 with the shoulder 35. The neutralizing plunger, in its outward movement, engages the neutralizing bar 31 and the latter is moved from the full line to the dotted line position thereof shown in Figure 1, thus moving the lugs 14, 15, 16 and 17 into alignment. When the lugs 15 and 16 are in alignment, the transmission gearing is in neutral. Substantially simultaneously with the bringing of the lugs into alignment the cam portion 36 of the dog engages the inclined shoulder 37, whereby the dog is rocked on its pivot to disengage the hook 34 from the lug 35. Further outward movement of the actuator bar is effected to move outwardly the particular gear shifting rod whose lug is in alignment with the actuator bar. For example, in Figure 1 the actuator bar is shown aligned with the lug 16. After the lugs have been moved to the neutral position in the manner described the continued outward movement of the actuator bar moves the lug 16 and the gear shifting rod 4 outwardly, while the lug 17 and the gear shifting rod 6 are correspondingly moved inwardly through the pinion 10. The inward movement of the lug 17 causes the neutralizing bar 31 and the neutralizing plunger 30 to be moved back to normal position. When the operator releases the clutch pedal the spring 29 retracts the actuator bar 11 and when the bar is fully retracted the hook 34 drops behind the shoulder 35. In order to positively rock the dog 32 on its pivot to position the hook 34 behind the shoulder 35 an inclined shoulder 38 is provided on the top of the selector lever for engagement with the rear end of the dog.

It will be apparent that the position of the selector lever 12 determines the character of the gear shift. This lever is subject to hand control from the steering column of the vehicle. Referring to Figure 13, a quadrant 39 is mounted on the steering column of the vehicle and has a series of notches therein corresponding to the reverse, neutral, low, intermediate and high positions of the selector lever. A hand control lever 40 cooperates with these notches. This lever is carried by the upper end of a shaft 41 extending longitudinally of the steering column and having a bevel pinion 42 at its lower end engaging a bevel pinion 43. The latter pinion is operatively connected by a connecting rod 44 with a bar 45 sliding in the casing 2. The bar 45 is pivoted at its rear end at 45′ to the end of an arm 46 integral with the selector lever and extending substantially at right angles thereto. The bar 45 has a series of recesses therein corresponding to the reverse, neutral, low, intermediate and high positions of the selector lever. Cooperating with these recesses is a spring-pressed detent 47.

Outward movement of the gear shifting rods 5, 3, 4 and 6 is effective to shift the transmission gearing for reverse, low speed, intermediate speed and high speed. When the hand control lever 40 is in engagement with the neutral notch on the quadrant 39 the selector lever 12 is in the dotted line position shown in Figure 1. When the selector lever is in this position, if the operator depresses the clutch pedal the neutralizing bar 31 is moved outwardly by the neutralizing plunger 30 until the lugs 14, 15, 16 and 17 are aligned. Further outward movement of the actuator bar 11 is prevented by reason of the fact that the end of the bar engages both of the lugs 14 and 15.

The selector lever is operatively connected to the clutch pedal whereby each operation of the clutch pedal to shift the transmission gearing is effective to position the selector lever to pre-select the character of the gear shift which will be effected by the next succeeding operation of the clutch pedal. Sliding in the casing 2 beneath the bar 45 is a selector lever operating bar 48 having in its rear end portion a longitudinally extending slot 49 into which extends a pin 50 carried by the rocker arm 25. This operating bar carries a dog 51 positioned in a recess 52 in the bar and pivoted to rock about a vertical axis 53. This dog has a tooth 54 adapted to cooperate with three teeth 55, 56 and 57 projecting from the outer end of the arm 46 of the selector lever and thereby shift said selector lever to different positions.

The cooperation of the dog 51 with the teeth 55, 56 and 57 will be more apparent by reference to Figure 3 to 8, inclusive. The dog has an upwardly extending lug 58 adapted to cooperate with a guide lug or cam 59 projecting downwardly from the casing 2. When the operator depresses the clutch pedal to release the clutch and shift the transmission gearing, the operating bar 48 is moved outwardly by reason of its operative connection with the rocker arm 25. On the outward movement of the operating bar the lug 58 moves on the outer surface of the guide lug 59, as shown in Figure 6. The casing 2 has an inclined shoulder 60 for engagement with the end of the dog 51 whereby when the operating bar is moved from the position shown in Figure 6 to the position shown in Figure 3, the dog is rocked about its pivot and assumes the position shown in Figure 3. Figure 3 shows the position of the arm 46 when the hand control lever 40 is set for reverse. In this position of the arm the actuation of the clutch pedal will effect the shifting of the gearing for reverse. When the operator releases the clutch pedal the operating bar 48 is retracted by the spring 29 and moves inwardly from the position shown in Figure 3 to the position shown in Figure 4. During the inward movement of the operating bar the lug 58 moves on the inner surface of the guide lug 59 and the tooth 54 engages the tooth 55 of the arm 46 and shifts said arm to the position shown in Figure 4. Another lug 61 projects downwardly from the casing and is arranged to engage a shoulder 62 on the dog 51 when the parts have assumed the position shown in Figure 4, and to rock said dog on its pivot to disengage the tooth 54 from the tooth 55 as the operating bar 48 completes its inward movement, as will be apparent by reference to Figure 5. The rocking of the dog 51 on its pivot to disengage the tooth 54 from tooth 55 in the manner described is also effective to position the lug 58 so that upon outward movement of the operating bar 48 the lug 58 will move on the outer surface of the guide lug 59 in the manner illustrated in Figure 6.

Figure 5 illustrates the position of the arm 46 when the transmission gearing is in reverse. In this position of the arm the succeeding operation of the clutch pedal will be effective to shift the transmission gearing into low speed. This operation of the shifting into low speed will be effective to cause the lug 58 to engage the tooth 56 and shift the selector lever 12 to a position such that the next succeeding operation of the clutch pedal will shift the transmission gearing into intermediate speed. The shifting of the transmission gearing into intermediate speed will be effective to cause the lug 58 to engage the tooth 57 and shift the selector lever into a position such that the next succeeding operation of the clutch pedal will cause the transmission gearing to be shifted into high speed.

The position of the arm 46 when the transmission gearing is in intermediate speed and the selector lever 12 in such position that the next succeeding operation of the clutch pedal will shift the gearing into high speed is shown in Figure 7. To shift the transmission gearing into high speed does not require the actuator bar 11 to be moved outwardly to as great an extent as does the shifting of the gearing into reverse and low and intermediate because of the fact that in high speed there is a direct engagement between the driving shaft and the propeller shaft of the vehicle, as is well understood. Therefore, when the clutch pedal is operated to shift the gearing into high speed the operating bar 48 only moves outwardly to the extent shown in Figure 7. During this outward movement of the operating bar the lug 58 moves on the outer surface of the guide lug 59 as when shifting into reverse, low or intermediate. However, the bar 48 does not move outwardly far enough for the dog 51 to cooperate with the inclined shoulder 60 to rock the dog 51 into the position shown in Figure 3. Therefore, as the operating bar 48 moves inwardly the lug 58 moves on the outer surface of the lug 59, as shown in Figure 8, so that the tooth 54 does not engage any of the teeth on the arm 46 during this inward movement of the operating bar.

After the transmission gearing has been shifted from reverse through low and intermediate to high speed in the manner described, succeeding operations of the clutch pedal will be effective to alternately shift the gearing from high to intermediate speed and from intermediate speed to high speed. In order to accomplish this result the selector lever 12 is actuated by the operating bar 48 through means shown in Figures 9, 10 and 11. Pivoted to the bottom of the casing 2 to swing about the same vertical axis 63 are two dogs 64 and 65. Projecting downwardly from the operating bar 48 on opposite sides thereof are two fingers 66 and 67, the finger 66 being arranged to cooperate with a tooth 68 projecting from the dog 64 and the finger 67 being arranged to engage one end of the dog 64 and swing the same in one direction on its pivot. The dog 65 has a lug 69 projecting upwardly therefrom for cooperation with a downwardly extending lug 70 on the arm 46. The shifting of the transmission gearing into intermediate speed shifts the arm 46 from its position, as shown in dotted lines in Figure 9 and in full lines in Figure 10, to the full line position thereof shown in Figure 9. During this movement of the arm the lug 70 engages the lug 69 and swings the dog 65 in a clockwise direction about its pivot. During this movement of the dog 65 a shoulder 71 thereon engages an end of the dog 64 and swings the latter in a clockwise direction to project its tooth 68 into the path of the finger 66. When the clutch pedal is operated to shift the gearing into high speed the outward movement of the operating bar 48 causes the finger 66 to engage the tooth 68, as shown in Figure 11, and thereby swing the dog 64 in a clockwise direction away from the shoulder 71. This allows the finger 66 to pass by the tooth 68 on the outward movement of the bar 48. The swinging of the dog in a clockwise direction by the engagement of the finger 66 with the tooth 68 brings one end of the dog into the path of the finger 67 so that immediately after the finger 66 has passed by the tooth 68 the finger 67 engages the dog 64 and rotates it in a counter-clockwise direction until its end again comes into engagement with the shoulder 71. Upon the inward movement of the operating bar 48 the finger 66 engages the tooth 68 and rotates the dog 64 in a counter-clockwise direction. This causes a similar movement of the dog 65 by reason of the engagement of the end of the dog 64 with the shoulder 71. During the counter-clockwise movement of the dog 65 the lug 69 cooperates with the lug 70 to swing the arm 46 from the full line position shown in Figure 9 to the position shown in Figure 10. In this position of the arm 46 the next operation of the clutch pedal will effect the shifting of the gearing into intermediate speed.

It will be apparent that after the gearing has been shifted by successive operations of the clutch pedal from reverse through low and intermediate into high speed, successive operations of the clutch pedal will thereafter shift the gearing, alternately, from high speed into intermediate speed and from intermediate speed into high speed until the hand control lever 40 is moved into position for neutral, reverse or low speed.

While I have shown the gear shifting mechanism and its selector means operatively connected to the clutch pedal as a convenient means for operating the same, it will be apparent that any other convenient means may be employed for operating the gear shifting mechanism and selector means. The slots 23 and 49 in the push-rod 18 and operating bar 48 permit a sufficient movement of the clutch pedal to disengage the clutch without actuating the gear shifting mechanism and its selector means. After the clutch has been disengaged by the initial inward movement of the clutch pedal, further inward movement of the clutch pedal shifts the transmission gearing into neutral in any position of the selector lever and the final inward movement of the clutch pedal effects a gear shift, provided the selector lever is in position for reverse, low, intermediate or high. If the selector lever is in neutral position, operation of the clutch pedal will first disengage the clutch and thereafter move the transmission gearing into neutral position, but a gear change cannot be effected if the selector lever is in the neutral position. The construction is such that when the selector lever is in position for reverse, low, intermediate or high, the operator can shift the transmission gearing into neutral without effecting a gear change. The operator can determine this neutral position of the gearing by the feel of the clutch pedal. After the gearing has been shifted in this manner into neutral position, if the operator releases the clutch pedal the transmission gearing will remain in neutral until the operator again fully depresses the clutch pedal, whereupon a gear change will take place. This is an important feature of the invention in that it permits the operator to quickly shift the transmission gearing into neutral without requiring that he operate the hand control lever 40. As already explained, after the transmission gearing has been shifted into high speed, further successive operations of the clutch pedal will alternately shift the transmission gearing from high to intermediate and from intermediate to high. This is a very decided advantage of the invention because of the fact that when the transmission gearing is in high and the the operator is compelled to bring the vehicle to slow speed or to a full stop he can accomplish this by operating the clutch pedal to throw out the clutch and shift the transmission gearing for intermediate speed. When he releases the clutch pedal the clutch will be re-engaged with the gearing in intermediate speed, which is very desirable. Of course, if the vehicle is going up grade at this time the operator can shift to low speed by operating the hand control lever 40, but if the vehicle is traveling down hill or on the level the operator can shift from high speed to intermediate speed by operating the clutch pedal.

In order to prevent accidental angular movement of the selector lever 12 during outward movements of the actuator bar 11, the latter may be provided at its forward end with a guide roller 72 capable of co-operation with radial grooves (not shown) in the cover of the casing 2. When the actuator bar is aligned with one of the lugs 14, 15, 16 and 17 and moved outwardly, the roller 72 will move in the corresponding radial groove.

While I have shown and described a preferred embodiment of my invention, it will be understood that the invention is not limited to the embodiment illustrated, but may be otherwise embodied within the scope of the appended claims.

I claim:

1. Gear shifting mechanism, comprising manually operated means for actuating said mechanism and automatic selector means whereby successive operations of said manually operated means are effective to shift the gearing first through a predetermined sequence of different operating positions and thereafter through a different predetermined sequence of operating positions, substantially as described.

2. Gear shifting mechanism, comprising manually operated means for acuating said mechanism and automatic selector means whereby successive operations off said manually operated means are effective to shift the gearing first through a predetermined sequence of different operating positions and thereafter through a different predetermined sequence of operating positions, and a hand control means to modify selectively the sequence of different operating positions of said gearing, substantially as described.

3. Gear shifting mechanism, comprising a selector, a speed change actuator carried thereby for shifting the gearing into different operating positions in accordance with different positions of said selector, manually operable means for operating said actuator to effect a gear change, means automatically responsive to each operation of said actuator for moving said selector into position to effect a predetermined gear change on the next succeeding operation of said actuator, and a manually adjustable control means for moving said selector into different positions independently of said automatic means, substantially as described.

4. A gear shifting mechanism, comprising a selector, a speed change actuator controlled thereby for shifting the gearing into different operating positions in accordance with different positions of said selector, manually operable means for operating said actuator to effect a gear change, and means automatically responsive to each operation of said actuator for moving said selector into position to effect a predetermined gear change on the next succeeding operation of said actuator and manually adjustable means for varying the order of selection, substantially as described.

5. Gear shifting mechanism for transmission gearing having three speeds forward and one speed in reverse, comprising a selector, a speed change actuator controlled thereby for shifting the gearing into different operating positions in accordance with different positions of said selector, manually operated means for operating said actuator to effect the gear changes, means automatically responsive to each operation of said actuator for moving said selector into position to effect a predetermined gear change on the next succeeding operation of said actuator, and a hand control means for moving said selector into different positions inedependently of said automatic means, the construction being such that when the hand control means is initially set for low or reverse, successive operations of said manually operated means will be effective to shift the transmission gearing first into low or into reverse and then into low, then into intermediate, then into high, and thereafter alternately from high into intermediate and from intermediate into high until said hand control means is set for neutral, low or reverse, substantially as described.

In testimony whereof I have hereunto set my hand.

KENYON COTTRILL.